A. J. PETERTYL.
FRUIT PICKER.
APPLICATION FILED FEB. 5, 1910.

971,925.

Patented Oct. 4, 1910.

WITNESSES:
George Bambay.

INVENTOR
Anthony J. Petertyl
BY
ATTORNEYS

UNITED STATES PATENT OFFICE.

ANTHONY J. PETERTYL, OF TRAVERSE CITY, MICHIGAN.

FRUIT-PICKER.

971,925.  Specification of Letters Patent.  Patented Oct. 4, 1910.

Application filed February 5, 1910. Serial No. 542,203.

*To all whom it may concern:*

Be it known that I, ANTHONY J. PETERTYL, a citizen of the United States, and a resident of Traverse City, in the county of Grand Traverse and State of Michigan, have invented a new and Improved Fruit-Picker, of which the following is a full, clear, and exact description.

The invention is an improvement in fruit pickers, more especially for cherries, and belongs to that class of such devices as comprise a receptacle having clippers or shears arranged thereover for cutting off the fruit, the latter dropping into the receptacle as the stems are severed.

The present invention has in view the operation of the shears by the depression of a lever with one of the fingers, or the thumb of the hand by which the receptacle is held, the construction being such that the fruit can be reached at a considerable distance from the gatherer and had in plain view as it is cut off. The receptacle is preferably provided with a releasable bottom so that the fruit can be conveniently discharged.

Reference is to be had to the accompanying drawings forming a part of this specification, in which similar characters of reference indicate corresponding parts in both views.

Figure 1:
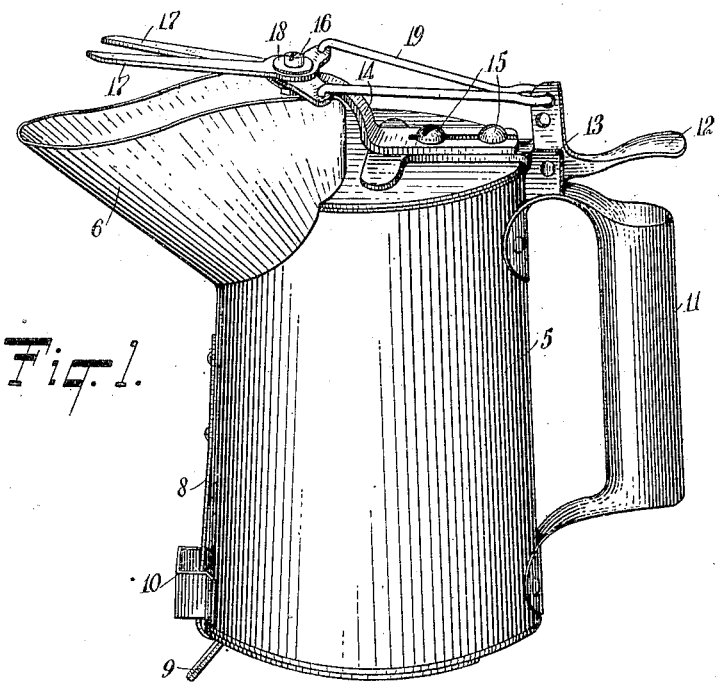
Figure 2:
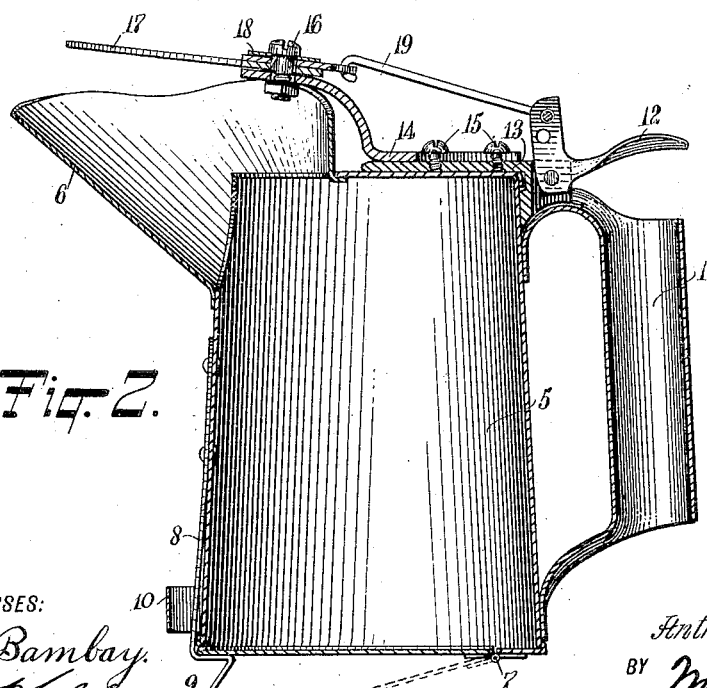

Figure 1 is a perspective view of a fruit picker constructed in accordance with my invention; and Fig. 2 is a central vertical section of the same.

A receptacle 5 for receiving the fruit, is in the nature of an upright vessel of suitable capacity, having a flaring throat 6, extending upwardly and outwardly from the top adjacent to the edge, with the bottom of the vessel hinged at one side, as indicated at 7, and engaged at the opposite side and held in closed position by a spring catch 8, the spring catch having a downwardly and outwardly-inclined thumb-piece 9 at its end, by which the spring is retracted, and serving as a cam by which the catch is automatically sprung outwardly when the bottom is forced to closed position, the outward movement of the spring catch being limited by a keeper 10, and the upper end of the catch riveted or otherwise rigidly secured to the side of the vessel. The vessel at the opposite side is provided with a vertical handle 11, over which is arranged a thumb-lever 12, the latter being of bell-crank form and fulcrumed intermediate its length to a bracket 13, which, as shown, is carried at the top of the vessel and has downwardly-extended ears at the side, between which the thumb-lever is received. A support 14 is offset to extend over the inner portion of the throat 6, and seats flat on the bracket 13, where it is longitudinally slotted and adjustably held in place by screws 15 threaded into the bracket. On the free end of the support are fulcrumed on a screw or pin 16, the cutting blades 17, 17, of a pair of shears, the shears being arranged at the top of the support, and the fulcrum screw or pin in addition to passing through them and the support, also passing through a washer or other suitable device 18 arranged under the head of the screw and affording a substantial bearing. The blades 17 of the shears are crossed and slightly bell-crank in form, with the portions at the inner side of the pivot operatively connected to the upright arm of the thumb-lever 12, by a fork of spring wire 19, the arms of the fork having a tendency to spread apart, whereby when the thumb-piece of the thumb-lever is depressed to cause the blades of the shears to move together, as when severing the fruit, the blades will be automatically swung apart when the thumb-lever is released. The spring yoke is preferably assembled with the thumb-lever and the blades of the shears by providing each with an aperture at the point the connection is to be made, the fork being passed into this aperture of the lever and hooked at each end, as shown in Fig. 2, to engage in the apertures of the blades. The vertical arm of the thumb-lever may be provided with one or more of these apertures if desired, arranged at different distances from the fulcrum of the lever so that the leverage can be changed if desired. By means of the adjustment of the support 14, the shears can be moved forward or rearward in their approximate horizontal position over the throat.

In the use of the picker, the gatherer will ordinarily grasp the handle of the vessel with the fingers, with the thumb resting on the thumb-piece of the operating lever. In this way the vessel is easily passed under the fruit and the shears operated to cut it off and allow it to fall into the vessel. When the vessel is filled it is readily discharged by releasing the hinged bottom, thus permitting a measured quantity of fruit to fall out.

Having thus described my invention, I claim as new and desire to secure by Letters Patent.

1. A fruit picker comprising a receptacle having a handle, a fruit clipper carried by the receptacle and having pivotally-connected shear blades movable in a plane approximately transverse to and over the receptacle in a position to permit of the fruit dropping into the receptacle as it is cut off, and means to swing the blades of the clipper on their pivots each relatively to the other and to the receptacle, carried by the receptacle with the said means arranged over the top of the handle in a position to be operated by a finger of the hand with which the handle is grasped.

2. A fruit picker comprising a vessel having an upright handle attached to the side and spaced therefrom for the passage of the hand, a fruit clipper secured directly to the top of said vessel and located in a position to permit of the fruit dropping into the vessel as it is cut off, and a thumb-actuated lever fulcrumed to the vessel independently of and operatively connected to the clipper and arranged at a point over the top of the handle to be operated by the thumb of the hand with which the handle is grasped.

3. A fruit picker comprising a vessel to receive the fruit, shears carried by the vessel having blades pivoted together to clip the fruit and movable in a plane approximately transverse to and over the vessel, and a thumb-actuated lever fulcrumed to the vessel near the top thereof and operatively connected to both of the blades of the shears to swing the blades together when the lever is depressed.

4. A fruit picker comprising a vessel to receive the fruit, a pair of shears to clip the fruit, arranged over and connected to the vessel, an operating lever fulcrumed to the vessel, and a spring fork having its arms rigidly connected and operatively connecting the lever to the blades of the shears and normally tending to force the blades of the shears apart.

5. A fruit picker comprising a vessel having a flaring throat arranged at the top adjacent to one side, shears for severing the fruit, arranged over the throat and connected to the vessel, a handle attached to the side of the vessel, and a thumb-actuated lever fulcrumed to the vessel and arranged over and directly operative from the handle and operatively connected to the blades of the shears.

6. A fruit picker comprising a vessel having a flaring throat at the top, a handle attached to the side of the vessel, shears to sever the fruit secured to the top of the vessel, having blades pivoted together and arranged over the throat, and a bell-crank operating lever fulcrumed to the vessel, having one arm extended over and directly operative from the handle and the other arm operatively connected to both of the blades of the shears.

In testimony whereof I have signed my name to this specification in the presence of two subscribing witnesses.

ANTHONY J. PETERTYL.

Witnesses:
ETHEL McEVOY,
MALCOLM WINNIE.